F. J. TONE.
RECUPERATOR.
APPLICATION FILED MAR. 24, 1922.

1,433,248.

Patented Oct. 24, 1922.

INVENTOR

Patented Oct. 24, 1922.

1,433,248

UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

RECUPERATOR.

Application filed March 24, 1922. Serial No. 546,283.

*To all whom it may concern:*

Be it known that I, FRANK J. TONE, a citizen of the United States, residing at Niagara Falls, in the county of Niagara and State of New York, have invented a new and useful Improvement in Recuperators, of which the following is a full, clear, and exact description.

This invention relates to refractory structures known as recuperators which are used for preheating air or gas in the operation of many types of heating and combustion furnaces, and particularly refers to the use of silicon carbide in the construction of certain parts of the recuperators by the use of which much more efficient results are obtained than with the constructions heretofore used.

A recuperator is a device in which the waste heat of escaping gases is given out to colder air or gas by a transfer of the heat through the walls of the passages which separate the respective streams of gases.

In the drawings, in which is illustrated the preferred embodiment of the invention,—

Figure 1:
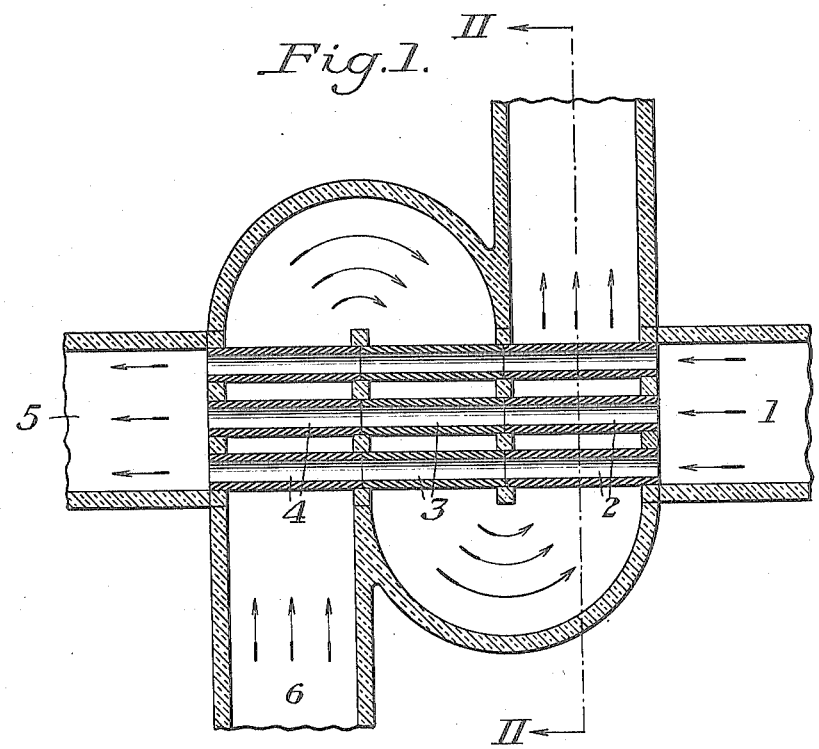
Figure 1 is a horizontal section taken along the line I—I of Figure 2.
Figure 2:
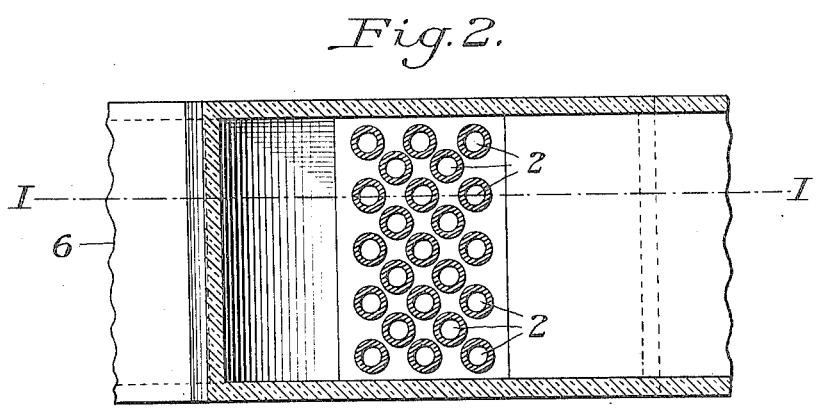
Figure 2 is a vertical section taken along the line II—II of Figure 1.

In the drawings, the invention is illustrated as applied to one of the common types of recuperators. The highly heated gas which is brought to the recuperator for the purpose of extracting its sensible heat is shown as entering the recuperator at 1. It traverses three banks of tubes 2, 3 and 4 set in a straight line longitudinally and is then discharged from the recuperator at 5. Recuperator parts, especially the walls or partitions separating the hot and cold gases, are usually made of fire clay, but this material while able to stand fairly high temperatures is not a good conductor of heat. Iron is sometimes used but this does not stand very high temperatures.

In my construction the tubes are refractory forms composed of silicon carbide grains bound together with a refractory binder after the manner of fire brick and are made with the thinnest possible walls which will still meet the mechanical stresses of the tubes and enable them to hold their shape at the temperatures reached. The cold gases which are passed through the recuperator for the purpose of absorbing heat from the hot gases are shown as entering the recuperator at 6, and pass through the passes formed by the banks numbered 4, 3 and 2, successively, around the outside of the tubes absorbing heat by conduction and radiation.

My invention relates to the use of silicon carbide as a refractory heat conducting and heat emitting medium in the recuperator and when used in the proper form it greatly increases the capacity of the recuperator and the fuel economy of the furnace. I have discovered that certain properties of silicon carbide function together in a way to give most efficient results when used for this purpose. These properties are 1st, heat emissivity, 2nd, thermal conductivity, 3rd, low co-efficient of expansion, and 4th, transverse strength.

The emissivity factor of a substance is the measure of its capacity to take up heat at the surface where it comes in contact with the substance carrying the heat, and likewise the factor which represents its capacity to similarly give up this heat at its surface to a colder medium, the factors being the same in each case. The emissivity factor of silicon carbide at 1000° C. is 0.10 gram calories per square centimeter per second or about two times greater than that of fire brick. This means that when silicon carbide is in contact with hotter gases, it will, other things being equal, take up the heat from the gases two times faster than fire clay, and likewise will emit the heat to colder gases at the same relative rate. It is apparent that this factor is of prime importance in a regenerator material.

The second property of silicon carbide which fits it for recuperators is its thermal conductivity. Its thermal conductivity is about five times that of fire clay refractories. The faster the heat is conducted through the recuperator walls, the more heat will be absorbed at the surface by the colder gases, and the reverse is also true that the more rapidly the heat is conducted from the hot surface of the wall to the cold surface, the more rapidly will the heat be emitted at the cold surface, other factors being equal. This factor therefore plays an important part in the walls of the recuperators.

The third property of silicon carbide which is of special value in recuperators is its low co-efficient of expansion. All recuperator parts, especially those subjected to the contact of hot gas on one side and cold gas on the other, are subjected to great differences of temperature and sometimes sudden changes of temperature. Under these conditions a material having a high co-efficient of expansion will crack and have short life. Carbide of silicon has been found to be especially fitted for withstanding the strains due to sudden changes of temperature. The spalling of carbide of silicon refractories is very low.

The fourth property of silicon carbide which fits it for recuperator construction is its high mechanical strength. Silicon carbide when made into refractory forms by well known processes, such as the bonding of the silicon carbide grains with a vitrified clay binder after the manner of fire brick, has a remarkable mechanical strength not only at normal temperatures but at the higher ranges of temperature reached in the recuperator. For example, at 1350° C., it has a modulus of rupture of approximately 2200 pounds per square inch. The modulus of rupture of fire clay refractories at 1350° C. is approximately 115 pounds per square inch, that is to say at recuperator temperatures a silicon carbide refractory has about nineteen times the cross-breaking strength of a fire clay refractory. For this reason silicon carbide refractory forms can be applied in many locations with very great advantage particularly where the form has to sustain itself when extended over a long span and supported only at the ends.

The term "silicon carbide" as used herein is intended as a term of general definition and not of limitation, and to include refractories containing silicon carbide on admixture with other materials, such, for example, as bonding materials.

I have shown in the drawings and have described a particular form of recuperator to which my invention is applied, but this is only one of a number of forms in which it may be used. The recuperator may be in the form of passages with plane partitions or septa forming the walls of the parallel passages, the alternate passages being used for the hot and cold gases. It is also possible to apply the principle to concentric rings or tubes.

The present invention is therefore not limited to its illustrated embodiment, but may be otherwise embodied within the scope of the following claims.

I claim:

1. A recuperator having silicon carbide heat transferring walls, substantially as described.

2. A recuperator having a plurality of passages provided with heat transferring silicon carbide walls, substantially as described.

In testimony whereof I have hereunto set my hand.

FRANK J. TONE.